United States Patent
Boulton

(10) Patent No.: US 9,415,715 B2
(45) Date of Patent: Aug. 16, 2016

(54) ARTICULATED MOTOR VEHICLE

(71) Applicant: Peter Boulton, Heyfield (AU)

(72) Inventor: Peter Boulton, Heyfield (AU)

( * ) Notice: Subject to any disclaimer, the term of this patent is extended or adjusted under 35 U.S.C. 154(b) by 0 days.

(21) Appl. No.: 14/443,110

(22) PCT Filed: Nov. 15, 2013

(86) PCT No.: PCT/AU2013/001318
§ 371 (c)(1),
(2) Date: May 15, 2015

(87) PCT Pub. No.: WO2014/075142
PCT Pub. Date: May 22, 2014

(65) Prior Publication Data
US 2015/0291212 A1    Oct. 15, 2015

(30) Foreign Application Priority Data
Nov. 16, 2012    (AU) ................. 2012905052

(51) Int. Cl.
*B60P 1/04*    (2006.01)
*B60P 1/06*    (2006.01)
*B60P 1/28*    (2006.01)
*B62D 12/00*   (2006.01)

(52) U.S. Cl.
CPC ... *B60P 1/04* (2013.01); *B60P 1/06* (2013.01); *B60P 1/28* (2013.01); *B62D 12/00* (2013.01)

(58) Field of Classification Search
CPC ............... B60P 1/04; B60P 1/06; B60P 1/28; B62D 12/00

USPC .... 298/1 C, 2, 8 T, 8 R, 17 R, 17 T; 280/442, 280/483, 486–488; 180/14.1, 235, 418
See application file for complete search history.

(56) References Cited

U.S. PATENT DOCUMENTS

| | | | |
|---|---|---|---|
| 2,649,162 A | 8/1953 | Wooldridge et al. | |
| 2,867,449 A | 1/1959 | Shawver | |
| 3,159,229 A | 12/1964 | Thwaites | |
| 4,147,375 A | 4/1979 | Bangert et al. | |
| 4,476,668 A | 10/1984 | Reilly | |
| 7,448,691 B2 * | 11/2008 | Brooks | A01D 43/00 298/17 T |
| 8,052,221 B2 * | 11/2011 | Deetjen | B60P 1/16 298/1 C |
| 2004/0080205 A1 | 4/2004 | Ducharme | |

FOREIGN PATENT DOCUMENTS

| | | |
|---|---|---|
| DE | 4226969 | 2/1994 |
| EP | 2368787 | 9/2011 |
| FR | 001199608 | 12/1959 |
| FR | 2560847 | 9/1985 |

* cited by examiner

Primary Examiner — Stephen Gordon
(74) Attorney, Agent, or Firm — Quarles & Brady LLP

(57) ABSTRACT

An articulated motor vehicle comprising: a body having a forward part and a rearward part, the forward part being articulated to the rearward part; and a load carrier, wherein the load carrier is disposed on the forward part of the vehicle and the rearward part is configured to support an operator, the forward part being engageable by the operator to steer the vehicle.

14 Claims, 4 Drawing Sheets

ARTICULATED MOTOR VEHICLE

CROSS REFERENCE TO RELATED APPLICATIONS

The present application is a national stage application filed under 35 U.S.C. §371 of PCT application PCT/AU2013/001318 filed on Nov. 15, 2013, which claims priority to Australian Patent Application 2012905052 filed Nov. 16, 2012. The foregoing applications are incorporated herein by reference in their entireties.

FIELD OF THE INVENTION

The present invention relates to an articulated vehicle. More particularly, but not exclusively, the present invention relates to an articulated vehicle for light agricultural use, such as in distributing feed for animals.

BACKGROUND OF THE INVENTION

Vehicles for light agricultural use are commonly used as they can reduce manual loading, increase work output and improve efficiency. Highly manoeuvrable vehicles, such as articulated vehicles, are particularly useful as they can be used in tight spaces and can transport loads quickly and efficiently.

Previous articulated vehicles can been heavy, expensive, difficult to manoeuvre and can cause surface damage to delicate surfaces. Smaller examples of previous articulated vehicles have been unable to support an operator, thereby limiting the distance they can cover for a given time.

Examples of the invention seek to solve, or at least ameliorate, one or more disadvantages of previous articulated motor vehicles.

SUMMARY OF THE INVENTION

According to the present invention, there is provided an articulated motor vehicle comprising: a body having a forward part and a rearward part, the forward part being articulated to the rearward part; and a load carrier, wherein the load carrier is disposed on the forward part of the vehicle and the rearward part is configured to support an operator, the forward part being engageable by the operator to steer the vehicle.

According to preferred embodiments, the forward part has a handle fixed thereto and engageable by the operator to steer the vehicle.

Preferably, the load carrier is configured for tipping, and, more preferably, the load carrier is configured for tipping forwardly of the vehicle.

Preferably, the load carrier can be engaged by the operator and pushed to cause the load carrier to tip. Preferably, the load carrier is resiliently biased toward a non-tipping condition. The load carrier can be biased by a tension spring extending from the forward part to the load carrier.

According to preferred embodiments, the handle is used to tip the load carrier.

Preferably, the forward part and the rearward parts are resiliently biased to return to a non-turning condition. The forward and rearward parts can be resiliently biased by a tension spring extending therebetween.

Preferably, the load carrier is in the form of an open topped bin.

According to preferred embodiments, the vehicle further comprises a motor disposed on the rearward part. Preferably, the motor is operated by a foot pedal disposed on the rearward part.

According to preferred embodiments, the rearward part comprises a coupling for connecting a trailer.

According to the present invention, there is also provided n assembly of a vehicle of the above described type and a trailer connected thereto.

Preferably, the trailer has a load carrier configured for tipping.

BRIEF DESCRIPTION OF THE DRAWINGS

Preferred embodiments of the invention will be further described, by way of non-limiting example only, with reference to the accompanying drawings in which.

DETAILED DESCRIPTION

Figure 1:
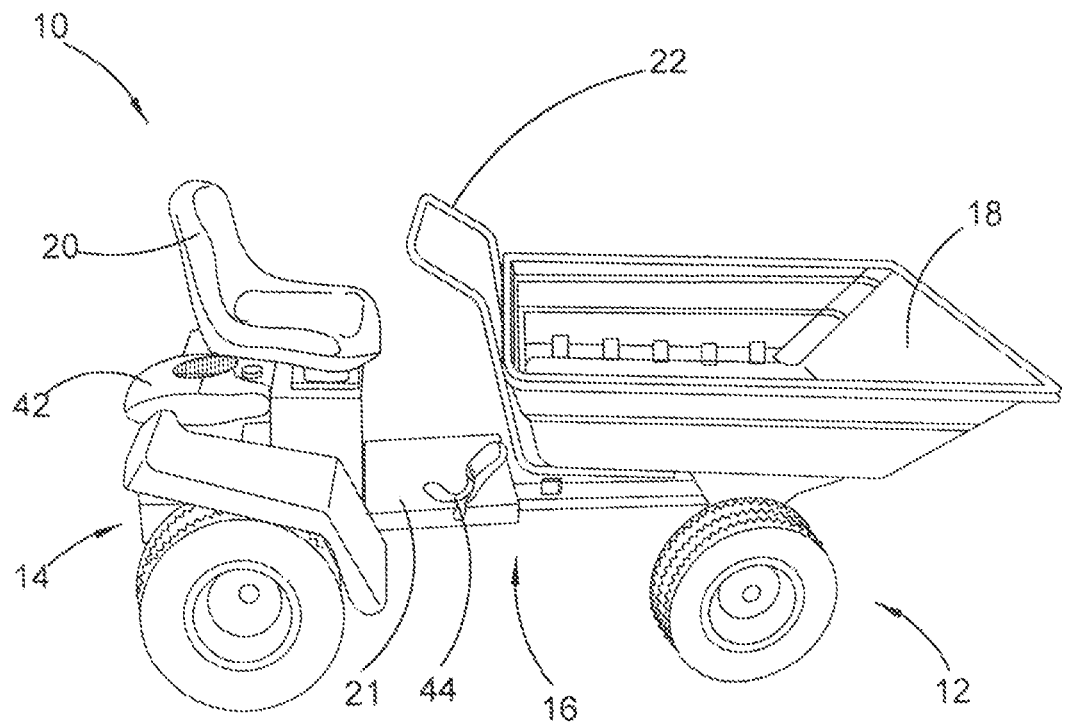
FIG. 1 is a side perspective view of a vehicle of one embodiment of the invention.

A vehicle 10 according to a preferred embodiment of the present invention is shown in FIG. 1. The vehicle 10 is articulated and motor operated. The vehicle 10 is configured for light agricultural use and has a capacity of 150 kg.

Figure 2:
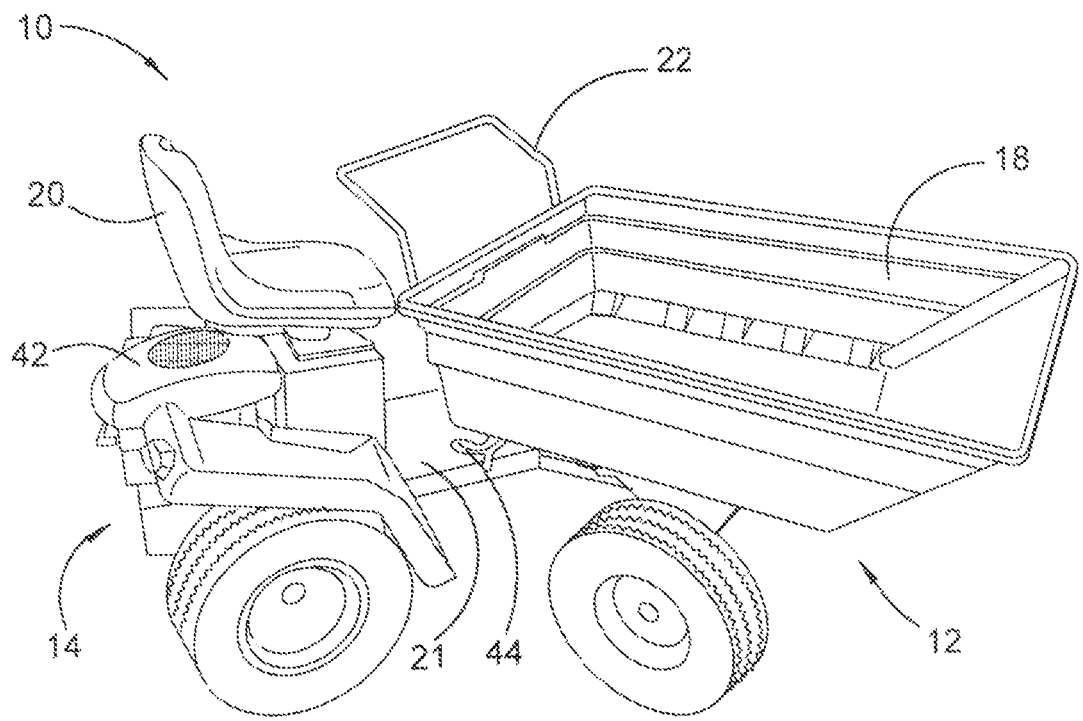
FIG. 2 is a side perspective view of the vehicle in another condition of use.
Figure 3:
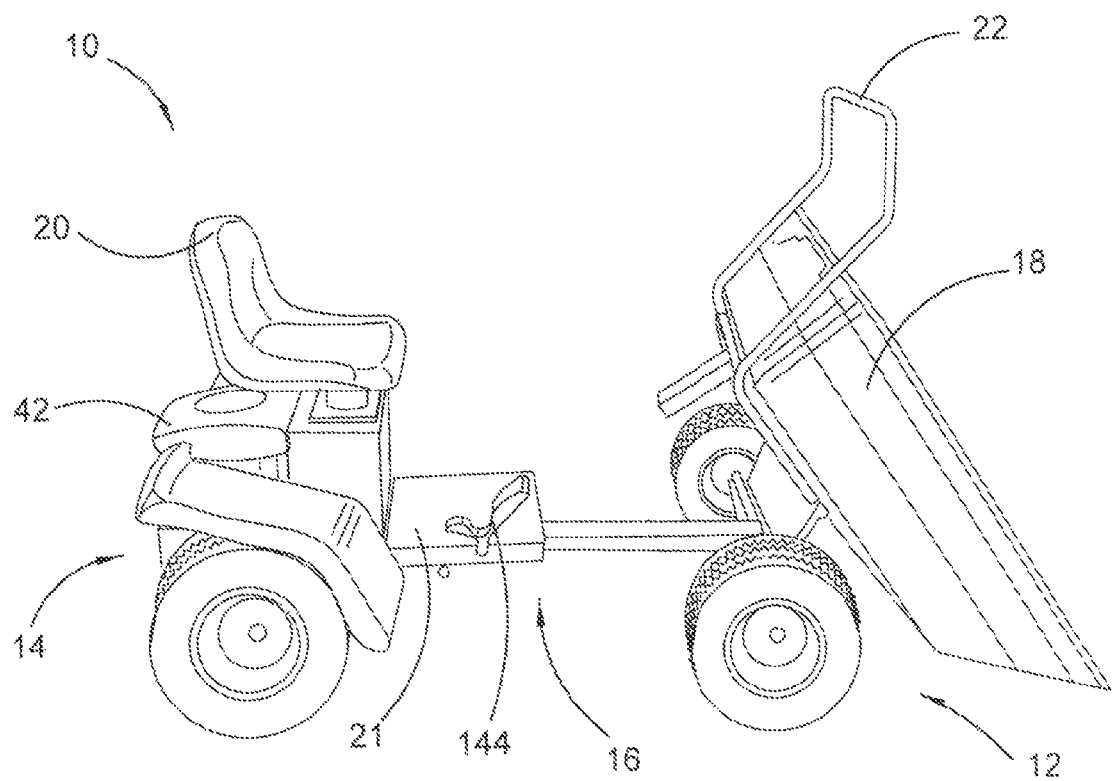
FIG. 3 is a side perspective view of the vehicle in another condition of use.

The vehicle 10 includes an articulated body having a forward part 12 and a rearward part 14. In this regard, the forward part 12 is articulated with respect to the rearward part 14. The forward part 12 is forwardmost in use and the rearward part 14 is rearmost in use. The body is articulated about a joint 16 which allows the forward part 12 and the rearward part 14 to articulate or pivot about the joint 16 so that the vehicle 10 can be turned. The joint 16 may be a simple pin joint which is configured to allow articulation about a single axis, while supporting the forward part 12 and the rearward part 14 so as to reduce or prevent pitching of the forward part 12 and the rearward part 14 of the vehicle 10 about a lateral axis. As illustrated in FIG. 2, the articulated body allows the vehicle to turn within a small turning circle, thereby improving the manoeuvrability of the vehicle and increasing the practicality of the vehicle, making it suitable for use in confined spaces such as horse stables.

The vehicle 10 also includes a load carrier 18. The illustrated load carrier 18 is in the form of an open topped bin having deep sides, similar to a load bed of a utility vehicle or the bin of a wheelbarrow, though it will appreciated that in other forms the load carrier may be a shallow tray or a flat tray with no sides at all.

The load carrier 18 is disposed on the forward part 12 of the vehicle and the rearward part 14 is configured to support an operator. A seat 20 is provided to support the operator, along with a deck 21 on which the operator can place their feet. The seat 20 may be spring loaded to cushion impact transferred to the operator and may tip forward to improve access to a drive motor. The forward part 12 is engageable by the operator to steer the vehicle. In the illustrated embodiment, the forward part 12 has a handle 22 fixed thereto and which is engageable by the operator to steer the vehicle 10. In the illustrated embodiment, the handle 22 is fixed to the load carrier 18 and moves with the load carrier 18. Accordingly, tipping of the load carrier 18 is caused by movement of the handle 22. Alternatively the handle 22 may be omitted and the load carrier engaged directly by the operator to steer or tip the vehicle 10.

The load carrier 18 is configured for tipping so that a load of goods contained in the tray 18 can be expelled therefrom. In one example, the vehicle 10 is used to distribute animal feed to stables. The feed would be loaded into the load carrier 18 and the vehicle driven into the stable and tipped. Owing to the articulated body, the vehicle 10 is highly manoeuvrable and can be turned within the confined space of a stable so as to quickly exit.

In the described embodiment, the load carrier 18 is configured for tipping forwardly of the vehicle, though it will be appreciated that the load carrier 18 may be configured to tip toward a side of the vehicle, if desired.

Figure 4:
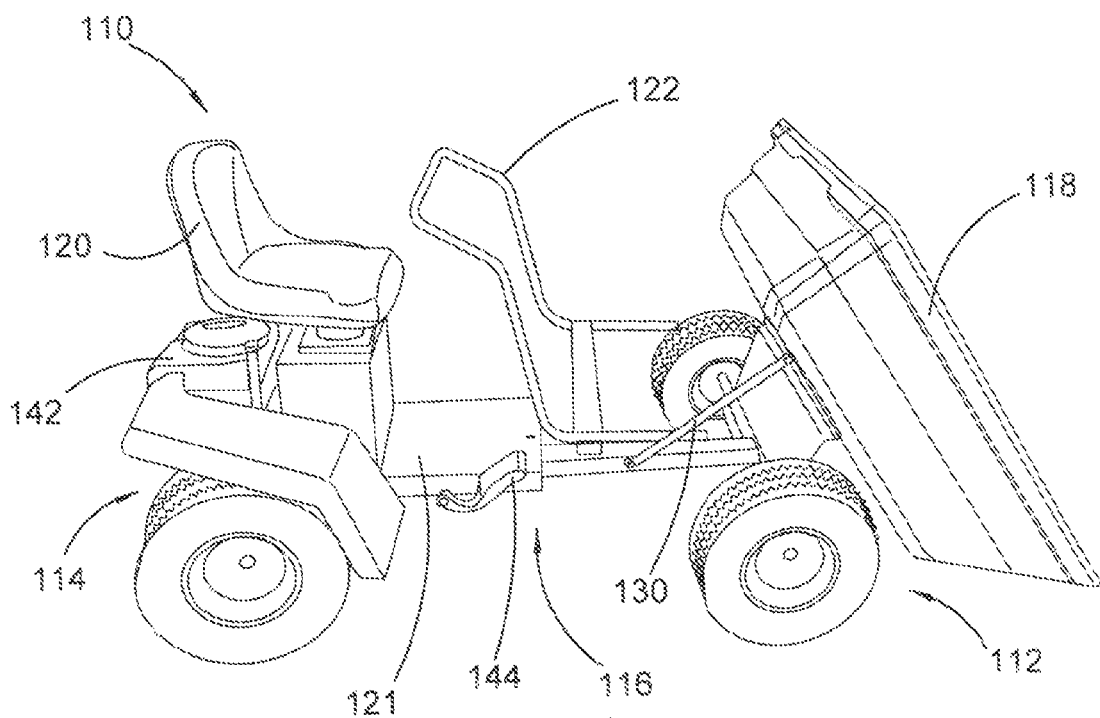
FIG. 4 is a side perspective view of a vehicle of a second embodiment of the invention.

A vehicle 110 according to another preferred embodiment of the present invention is shown in FIG. 4. Vehicle 110 is similarly configured to vehicle 10 and like features have been provided with reference numerals which are incremented by 100.

Vehicle 110 has a handle 122 which is fixed to the forward part 112 of the vehicle 110 and remains stationary when the load carrier 118 is tipped. As the handle 122 does not move during tipping, the load carrier 118 is directly engaged by the operator and pushed to cause the load carrier 118 to tip. As the handle 122 is fixed to the forward part 112 of the vehicle 110, its only function is in turning the vehicle, thereby increasing the stability of the vehicle 110 in use as unwanted tipping movement is reduced.

The load carrier 118 is resiliently biased toward a non-tipping condition. A return spring 130, in the form of a tension spring, is provided to this end, though it will be appreciated that other spring biasing configurations, such as torsion springs for example, may be used. The return spring 130 extends from the forward part 112 and is fixed to a lower part of the load carrier 118.

Figure 5:
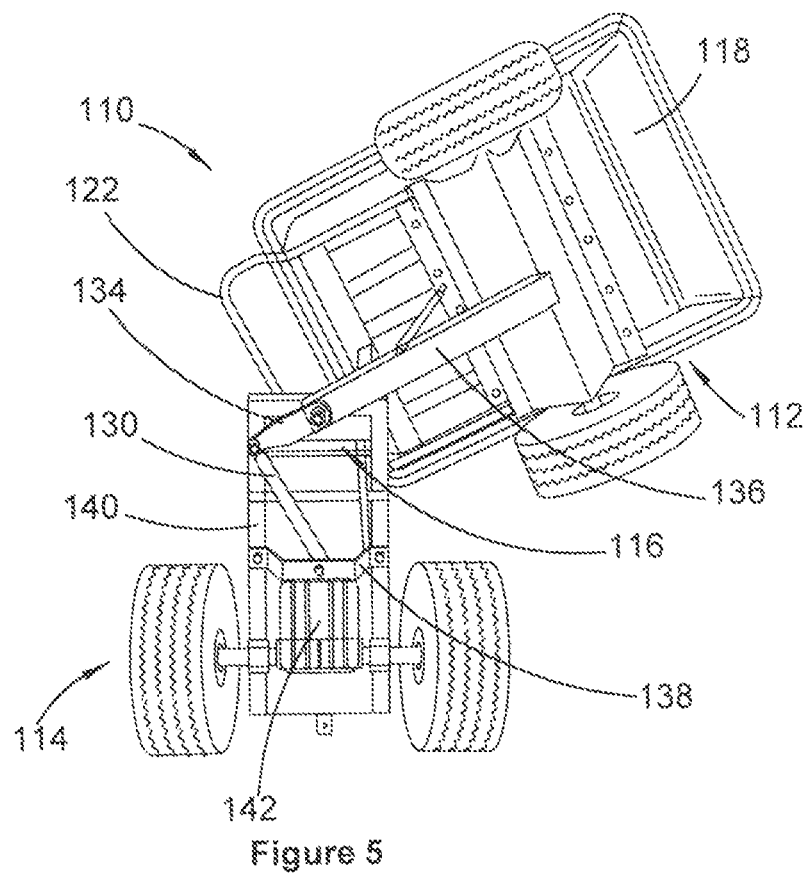
FIG. 5 is an underneath view of the vehicle of FIG. 4.

As illustrated in FIG. 5, the forward part 112 and the rearward part 114 are resiliently biased to return to a non-turning condition. To this end, a spring 132 extending between the forward part 112 and the rearward part 114 is provided. The spring 132 is fitted to a bar 134 which extends rearwardly from a frame 136 of the forward part 112 to a mounting 138 which is fixed to the frame 140 of the rearward part 114. As illustrated, articulation of the vehicle 110 will cause the spring 132 to be tensioned, thereby urging the vehicle 110 to return to a non-turning condition. Although a tension spring is shown, it will be appreciated that alternative biasing means, such as a torsion spring for example, may be used. Although not illustrated, it will be appreciated that vehicle 10 may similarly be biased to return to a non-turning condition.

Owing to the articulated nature of the vehicle, unintentional turning can be induced when heavily loaded or when driving up an incline. It can also be difficult to pull out of a turn at times, especially when accelerating. Provision of a spring 130 ameliorates these conditions, reducing the strength required to control the vehicle and generally improving handling of the vehicle.

The construction of the frame members 136, 140 is simplified so as to reduce weight of the vehicle. In the illustrated embodiment, the frame members 136, 140 are constructed of steel and joined using conventional joining techniques, though it will be appreciated that other materials such as aluminium may be used.

Each vehicle 10, 110 includes a drive 42, 142 disposed on the rearward part 14, 114. The drive 42, 142 includes a motor and transmission. As illustrated in FIG. 5, the drive is fitted to the frame 140. In the illustrated embodiments, the drive 42, 142 is removed from a conventional ride-on lawnmower and fitted to the frame 140, which is constructed so as to readily accept such a drive.

Figure 6:
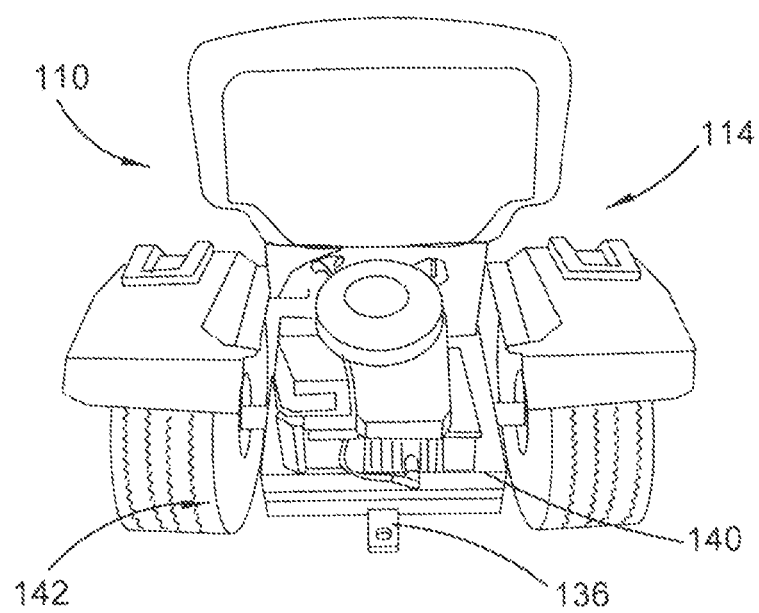
FIG. 6 is a rear perspective view of a vehicle of one embodiment of the invention.

As illustrated in FIG. 6, the drive 42, 142 includes a 5 hp internal combustion engine, which in the described embodiment has a capacity of 190 cc. It will be appreciated the drives of other sizes, power ratings and configurations may similarly be used. For example, the drive may include an electric motor. The drive 42, 142 is operated by a foot pedal 44, 144 which is disposed on the deck 21, 121 of the rearward part 14, 114 of the vehicle 10, 110. The foot pedal 44, 144 operates in a manner similar to that of a ride-on lawnmower and pivots about a central transverse axis so that pushing a forward portion of the pedal causes the vehicle to move forward and pushing a rearward portion of the pedal causes the vehicle to reverse.

The drive 42, 142 incorporates a hydrostatic transmission, though a manual transmission may similarly be used.

Figure 7:
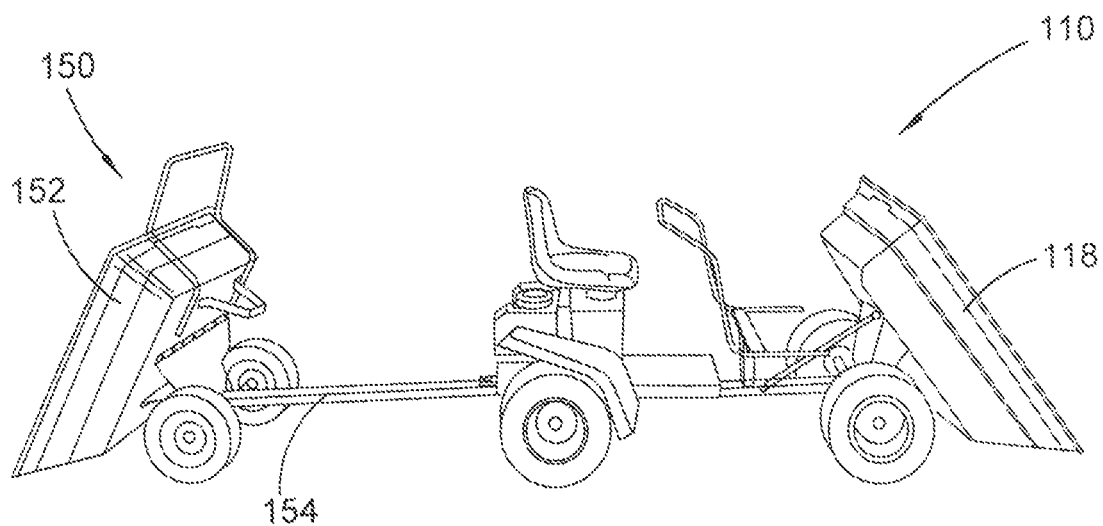
FIG. 7 is a side perspective view of the vehicle of FIG. 4 with a trailer fitted thereto.
Figure 8:
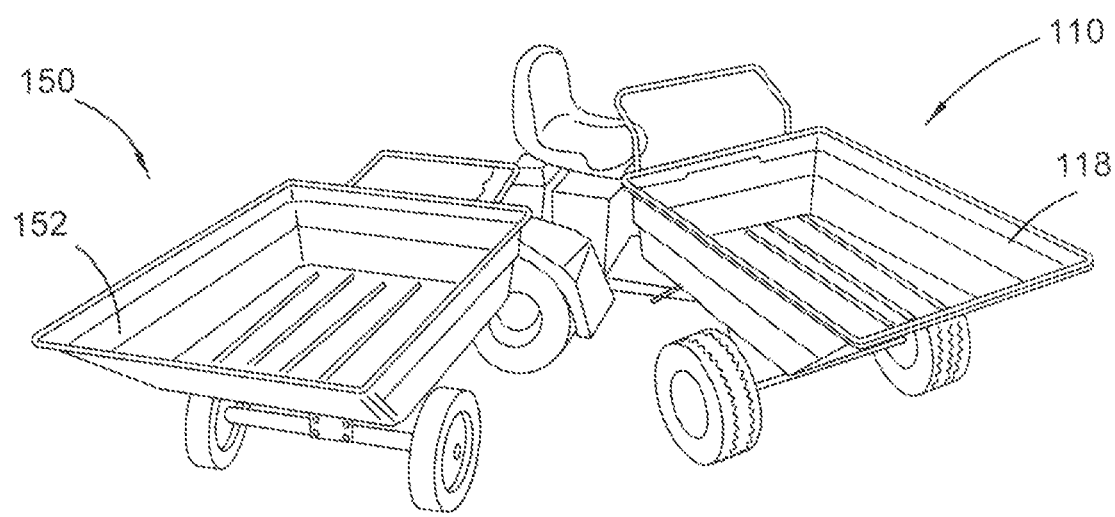
FIG. 8 is a side perspective view of the vehicle and trailer of FIG. 7 in another condition of use.

As illustrated in FIG. 6, the rearward part 114 has a coupling 146 for connecting a trailer. Although not shown, vehicle 10 may similarly be provided with such a coupling. The coupling 136 extends from the frame 140. FIGS. 7 and 8 show the vehicle 110 with a trailer 150 fitted to the coupling 136. The trailer 150 includes a drawbar 154 which extends from a first end which is configured to engage the coupling, to a second end that is fixed to an axle. The trailer 150 includes a load carrier 152, which in the illustrated embodiment is configured for tipping. It will be appreciated that a load carrier which does not tip may be provided.

The vehicle 10, 110 is well suited to towing a trailer and the articulated body of the vehicle 10, 110 allows the vehicle and trailer to turn within a confined space such as a stable, thereby taking advantage of increased load carrying capacity of the vehicle without compromising practicality of the vehicle.

Although vehicle 10, 110 has been described in relation to distributing feed in stables, it will be appreciated that the vehicle will have application in other industries, such as those which operate in connection with livestock, commercial or market gardens, or farming more generally.

The embodiments have been described by way of example only and modifications are possible within the scope of the invention disclosed.

The invention claimed is:

1. An articulated motor vehicle comprising:
a body having a forward part and a rearward part, the forward part being articulated to the rearward part; and
a load carrier configured for tipping,
wherein the load carrier is disposed on the forward part of the vehicle and the rearward part is configured to support an operator, the forward part being engageable by the operator to steer the vehicle, and wherein the forward part and the rearward part are resiliently biased to return to a non-turning condition.

2. A vehicle as claimed in claim 1, wherein the forward part has a handle fixed thereto and engageable by the operator to steer the vehicle.

3. A vehicle as claimed in claim 1 or claim 2, wherein the load carrier is configured for tipping forwardly of the vehicle.

4. A vehicle as claimed in claim 3, wherein the load carrier can be engaged by the operator and pushed to cause the load carrier to tip.

5. A vehicle as claimed in claim 3, wherein the load carrier is resiliently biased toward a non-tipping condition.

6. A vehicle as claimed in claim 5, wherein the load carrier is biased by a tension spring extending from the forward part to the load carrier.

7. A vehicle as claimed in claim 3, wherein the handle is used to tip the load carrier.

8. A vehicle as claimed in claim 1, wherein the forward and rearward parts are resiliently biased by a tension spring extending therebetween.

9. A vehicle as claimed in claim 1, wherein the load carrier is in the form of an open topped bin.

10. A vehicle as claimed in claim 1, further comprising a motor disposed on the rearward part.

11. A vehicle as claimed in claim 10, wherein the motor is operated by a foot pedal disposed on the rearward part.

12. A vehicle as claimed in claim 1, wherein the rearward part comprises a coupling for connecting a trailer.

13. A vehicle as claimed in claim 12, further comprising a trailer connected thereto.

14. A vehicle as claimed in claim 13, wherein the trailer has a load carrier configured for tipping.

\* \* \* \* \*